United States Patent
Haller et al.

(10) Patent No.: US 7,295,532 B2
(45) Date of Patent: Nov. 13, 2007

(54) SYSTEM, DEVICE AND COMPUTER READABLE MEDIUM FOR PROVIDING NETWORKING SERVICES ON A MOBILE DEVICE

(75) Inventors: Amit Haller, Belmont, CA (US); Peter Fornell, Lake Oswego, OR (US); Avraham Itzchak, Ra'anana (IL); Ziv Haparnas, Tel Aviv (IL)

(73) Assignee: IXI Mobile (R & D), Ltd., Ra'anana (IL)

( * ) Notice: Subject to any disclaimer, the term of this patent is extended or adjusted under 35 U.S.C. 154(b) by 298 days.

(21) Appl. No.: 09/932,180

(22) Filed: Aug. 17, 2001

(65) Prior Publication Data

US 2003/0035397 A1 Feb. 20, 2003

(51) Int. Cl.
*H04Q 7/00* (2006.01)
(52) U.S. Cl. .................................. 370/328; 370/338
(58) Field of Classification Search ............ 370/310.1, 370/310.2, 313, 319, 326, 328, 338, 345, 370/389, 392, 395.3, 395.54, 400, 401, 475
See application file for complete search history.

(56) References Cited

U.S. PATENT DOCUMENTS

| | | |
|---|---|---|
| 5,442,680 A | 8/1995 | Schellinger et al. |
| 5,457,737 A | 10/1995 | Wen |
| 5,572,528 A | 11/1996 | Shuen |
| 5,742,237 A | 4/1998 | Bledsoe |
| 5,771,438 A | 6/1998 | Palermo et al. |
| 5,774,791 A | 6/1998 | Strohallen et al. |

(Continued)

FOREIGN PATENT DOCUMENTS

JP 3153213 4/2001

(Continued)

OTHER PUBLICATIONS

White Paper, Handheld Devices: Comparing the Major Platforms, www.dell.com/r&d, Dec. 2000.

(Continued)

*Primary Examiner*—Chi Pham
*Assistant Examiner*—Anh-Vu Ly
(74) *Attorney, Agent, or Firm*—Century IP Group, Inc.; F. Jason Far-hadian, Esq.

(57) ABSTRACT

A system, device and computer readable medium that monitors and reconfigures a LAN by a WAN operator is provided. In an embodiment of the present invention, a telecommunications operator monitors and manages devices and/or applications communicating with a wireless device, such as cellular telephone. In an embodiment of the present invention, a telecommunication operator adds LAN network services to microrouter 404 in a cellular telephone without user intervention. In an embodiment of the present invention, the cellular telephone has a Bluetooth™ processor and transceiver. In an embodiment of the present invention, microrouter 404 includes a Bluetooth™ LAN Access Profile software component, routing software component, PPP server software component and a NAT software component. In an embodiment of the present invention, microrouter 404 includes hooks and interfaces for adding other network services, such as a Bluetooth™ Terminal Pairing Management software component, a VPN software component, Firewall component, Statistics software component, Link Optimization software component, LAN reverse firewall software component, Terminal Flashing software component, SMS software component, SLV and SLE software component and a Device Resources software component.

31 Claims, 6 Drawing Sheets

U.S. PATENT DOCUMENTS

| | | | |
|---|---|---|---|
| 5,793,763 A | 8/1998 | Mayes et al. | |
| 5,805,166 A | 9/1998 | Hall et al. | |
| 5,838,252 A | 11/1998 | Kikinis | |
| 5,896,369 A | 4/1999 | Warsta et al. | |
| 5,929,848 A | 7/1999 | Albukerk et al. | |
| 5,978,386 A | 11/1999 | Hamalainen et al. | |
| 5,987,011 A | 11/1999 | Toh | |
| 5,987,033 A | 11/1999 | Boer et al. | |
| 6,064,734 A | 5/2000 | Hasegawa et al. | |
| 6,067,291 A | 5/2000 | Kamerman et al. | |
| 6,069,896 A | 5/2000 | Borgstahl et al. | |
| 6,078,789 A | 6/2000 | Bodenmann et al. | |
| 6,085,098 A | 7/2000 | Moon et al. | |
| 6,130,602 A | 10/2000 | O'Toole et al. | |
| 6,151,628 A | 11/2000 | Xu et al. | |
| 6,198,948 B1 | 3/2001 | Sudo et al. | |
| 6,218,958 B1 | 4/2001 | Eichstaedt et al. | |
| 6,223,029 B1 | 4/2001 | Stenman et al. | |
| 6,243,581 B1 | 6/2001 | Jawanda | |
| 6,265,788 B1 | 7/2001 | Davidson et al. | |
| 6,282,183 B1 | 8/2001 | Harris et al. | |
| 6,298,443 B1 | 10/2001 | Colligan et al. | |
| 6,326,926 B1 | 12/2001 | Shoobridge et al. | |
| 6,333,973 B1 | 12/2001 | Smith et al. | |
| 6,343,276 B1 | 1/2002 | Barnett | |
| 6,434,537 B1 | 8/2002 | Grimes | |
| 6,446,127 B1 | 9/2002 | Schuster et al. | |
| 6,452,910 B1 | 9/2002 | Vij et al. | |
| 6,459,882 B1 | 10/2002 | Palermo et al. | |
| 6,463,078 B1 | 10/2002 | Engstrom et al. | |
| 6,487,180 B1 | 11/2002 | Borgstahl et al. | |
| 6,519,460 B1 | 2/2003 | Haartsen | |
| 6,532,366 B1 | 3/2003 | Chung et al. | |
| 6,600,428 B1 | 7/2003 | O'Toole et al. | |
| 6,600,734 B1 | 7/2003 | Gernert et al. | |
| 6,630,925 B1 | 10/2003 | Ostergangrd et al. | |
| 6,633,759 B1 | 10/2003 | Kobayashi | |
| 6,636,489 B1 | 10/2003 | Fingerhut | |
| 6,654,616 B1 * | 11/2003 | Pope et al. | 455/445 |
| 6,665,549 B1 | 12/2003 | Reed | |
| 6,891,820 B1 * | 5/2005 | Pham et al. | 370/338 |
| 2001/0022780 A1 * | 9/2001 | Mizutani et al. | 370/261 |
| 2001/0047424 A1 | 11/2001 | Alastalo et al | |
| 2002/0010008 A1 | 1/2002 | Bork et al. | |
| 2002/0010683 A1 | 1/2002 | Aune | |
| 2002/0037700 A1 | 3/2002 | Dooley et al. | |
| 2002/0055333 A1 | 5/2002 | Davies et al. | |
| 2002/0058502 A1 | 5/2002 | Stanforth | |
| 2002/0063472 A1 | 5/2002 | Irvin | |
| 2002/0065099 A1 | 5/2002 | Bjorndahl | |
| 2002/0065817 A1 | 5/2002 | Ito et al. | |
| 2002/0068559 A1 | 6/2002 | Sharma et al. | |
| 2002/0068600 A1 | 6/2002 | Chihara et al. | |
| 2002/0069037 A1 | 6/2002 | Hendrickson et al. | |
| 2002/0082054 A1 | 6/2002 | Keinonen et al. | |
| 2002/0086718 A1 | 7/2002 | Bigwood et al. | |
| 2002/0091633 A1 | 7/2002 | Proctor | |
| 2002/0102974 A1 | 8/2002 | Raith | |
| 2002/0118663 A1 | 8/2002 | Dorenborsch et al. | |
| 2002/0128051 A1 | 9/2002 | Liebenow | |
| 2002/0132610 A1 | 9/2002 | Chaplin et al. | |
| 2002/0142762 A1 | 10/2002 | Chmaytelli et al. | |
| 2002/0143952 A1 | 10/2002 | Sugiarto et al. | |
| 2002/0155830 A1 | 10/2002 | Iyer | |
| 2002/0160764 A1 | 10/2002 | Gorsuch | |
| 2003/0013438 A1 | 1/2003 | Darby | |
| 2003/0017810 A1 | 1/2003 | Janninck et al. | |
| 2003/0022699 A1 | 1/2003 | Lin | |
| 2003/0027563 A1 | 2/2003 | Herle et al. | |
| 2003/0027570 A1 * | 2/2003 | Yang et al. | 455/432 |
| 2003/0032417 A1 | 2/2003 | Minear et al. | |
| 2003/0050058 A1 | 3/2003 | Walsh et al. | |
| 2003/0054765 A1 | 3/2003 | Botteck | |
| 2003/0060188 A1 | 3/2003 | Gidron | |
| 2003/0060189 A1 | 3/2003 | Minear et al. | |
| 2003/0078036 A1 | 4/2003 | Chang et al. | |
| 2003/0091917 A1 | 5/2003 | Davenport et al. | |
| 2003/0114105 A1 | 6/2003 | Haller et al. | |
| 2003/0115351 A1 | 6/2003 | Giobbi | |
| 2003/0122856 A1 | 7/2003 | Hubbard | |
| 2003/0143992 A1 | 7/2003 | Humphrey et al. | |
| 2003/0153280 A1 | 8/2003 | Kopp et al. | |
| 2003/0187807 A1 | 10/2003 | Matsubara et al. | |
| 2003/0194090 A1 | 10/2003 | Tachikawa | |
| 2003/0214940 A1 | 11/2003 | Takken | |
| 2003/0224773 A1 | 12/2003 | Deeds | |
| 2003/0232616 A1 | 12/2003 | Gidron et al. | |
| 2004/0001467 A1 | 1/2004 | Cromer et al. | |
| 2004/0048671 A1 | 3/2004 | Rowe | |
| 2004/0066769 A1 | 4/2004 | Ahmavaara et al. | |
| 2004/0196812 A1 | 7/2004 | Barber | |
| 2004/0192384 A1 | 9/2004 | Anastasakos et al. | |
| 2005/0170825 A1 * | 8/2005 | Dowling | 455/418 |
| 2006/0046664 A1 | 3/2006 | Paradiso et al. | |

FOREIGN PATENT DOCUMENTS

| | | |
|---|---|---|
| WO | WO99/48315 | 9/1999 |
| WO | WO 00/39967 | 7/2000 |
| WO | WO 01/048977 | 7/2001 |

OTHER PUBLICATIONS

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Networking: Performance and Properties, IEEE, 1999.

Yee et al., "Integrating Bluetooth With Wireless and Ricocheting", pp. 1310-1314, 2000 IEEE.

Haartsen, "BLUETOOTH—The universal radio interface for ad hoc wireless connectivity", pp. 110-117, Ericsson Review No. 3, 1998.

Guthery et al., "The WebSIM—Clever Smartcards Listen to Port 80", version 15.12.99.

Project P946-GI, Smart Devices "When Things Start to Think", Jan. 2000, 2000 EURESCOM Participants in Project P946-GI.

Karagiannis, "Mobility support for ubiqultous Internet access", ERICSSON Open report, pp. 1-70, Dec. 21, 2000.

Frodigh et al., "Wireless ad hoc networking - The art of networking without a network", Ericsson Review No. 4, 2000, pp. 248-263.

Faruque et al, "Design and Analysis of Ad Hoc Wireless Networks for Battlefield Applications", Part of the SPIE Conference on Digitization of the Battlespace IV, Orlando, Florida, Apr., 1999, pp. 118-122.

Garcia-Luna-Aceves et al., "Wireless Internet Gateways (Wings)", 1997 IEEE, pp. 1271-1276.

* cited by examiner

U.S. 7,295,532 B2

SYSTEM, DEVICE AND COMPUTER READABLE MEDIUM FOR PROVIDING NETWORKING SERVICES ON A MOBILE DEVICE

FIELD OF THE INVENTION

This invention relates generally to networks.

BACKGROUND OF THE INVENTION

Managing and monitoring networks, such as wide area networks ("WANs") and local area networks ("LANs"), is a very important function.

An operator of a network needs to monitor network configuration and operation in order to maximize usage and accessibility of network services. An operator can use such information in reconfiguring a network or adding network service. A network operator also desires flexibility in easily adding network services without requiring user intervention. Often, a user does not have the technical ability or desire to reconfigure or add network services.

A user of a network is generally interested in particular applications that provide specific results, such as an application for retrieving an address from a database. Typically, a user of a network is not interested in network configuration and adding network services as long as the user's applications are providing results in a timely manner.

A wireless communication device, such as a cellular telephone, is typically a node of a WAN or communication network managed by a telecommunication operator. As described above, the user of a cellular telephone is typically not interested in a particular network configuration as long as particular applications are providing the desired results. However, the cellular telephone may also be a part of a LAN or network for communicating with other user devices, such as a laptop or Personal Digital Assistant ("PDA"). For example, Bluetooth™ technology (www.Bluetooth.com) provides wireless communications between devices. These other LAN devices may have applications that access the WAN; yet, a telecommunication operator has no visibility as to statistics on usage profiles of particular LAN devices and/or applications. The cellular telephone acts as a wall to prevent the telecommunication operator from monitoring or managing LAN devices and/or applications. Moreover, the telecommunication operator cannot easily add network services to the LAN without user intervention.

Therefore, it is desirable to provide a system, device and computer readable medium that allows a network operator to manage and monitor usage profiles of devices and applications on a LAN. It is further desirable to provide a system that allows a network operator to easily reconfigure or add network services to a LAN without user intervention. LAN devices then may be able to share information and services. In particular, it is desirable to provide a system that monitors usage profiles of devices and/or applications communicating with a cellular telephone.

SUMMARY OF THE INVENTION

A hand-held device for providing communication between a wide area network and a wireless local area network is provided according to an embodiment of the present invention. The device comprises a storage device coupled to a processor. The storage device stores a router software component for transferring a packet between the wide area network and the wireless local area network.

According to an embodiment of the present invention, the packet is an Internet Protocol ("IP") packet.

According to an embodiment of the present invention, the wide area network includes a plurality of public IP addresses and the wireless local area network includes a plurality of private IP addresses. The router software component translates the first IP address in the plurality of public IP addresses to a second IP address in the plurality of private IP addresses.

According to another embodiment of the present invention, the device includes a Bluetooth™ processor and a 2.4 GHZ transceiver.

According to still another embodiment of the present invention, the wide area network is the Internet, cellular network, corporate network and/or private IP network.

According to another embodiment of the present invention, the wireless local area network is a Bluetooth™ wireless local area network and/or an 802.11 wireless local area network.

According to another embodiment of the present invention, the router software component includes a network address translator ("NAT") software component for translating between a first wide area network address and a first local area network address.

According to another embodiment of the present invention, the router software component includes a network address port translation ("NAPT") software component for translating between a first wide area network address and a first local area network address.

According to an embodiment of the present invention, the router software component includes a local routing software component for routing the IP packet between a first wireless device in the wireless local area network and a second wireless device in the wireless local area network.

According to an embodiment of the present invention, the router software component includes an interface for adding a first network service software component for providing a network service to the wireless local area network.

According to still another embodiment of the present invention, the first network service software component is loaded into the storage device from a managing processing device in the wide area network.

According to another embodiment of the present invention, the first network service software component is loaded into the storage device during manufacturing of the hand-held device.

According to another embodiment of the present invention, the first network service software component is a pairing management software component for determining whether a first wireless device is coupled to the wireless local area network.

According to another embodiment of the present invention, the first network service software component is a virtual private network software component for establishing a secure link.

According to another embodiment of the present invention, the first network service software component is a firewall software component.

According to an embodiment of the present invention, the first network service software component is a statistics software component for collecting usage information of the wireless local area network.

According to an embodiment of the present invention, the statistics software component collects usage information of a wireless device in the wireless local area network.

According to an embodiment of the present invention, the statistics software component collects usage information from an application software component in a wireless device in the wireless local area network.

According to an embodiment of the present invention, the first network service software component includes a link optimization software component for converting the IP packet from a first wireless device in the wireless local area network to an optimized cellular protocol packet transferred to a processing device in the wide area network.

According to an embodiment of the present invention, the first network service software component includes a reverse firewall software component for dropping a packet from a first wireless device in the wireless local area network.

According to an embodiment of the present invention, the first network service software component includes a reverse firewall software component for dropping a packet from a first application software component on a first wireless device in the wireless local area network.

According to an embodiment of the present invention, the first network service software component includes a flashing software component for providing a flashing image to a first wireless device, in the wireless local area network, for updating a first wireless device capability.

According to an embodiment of the present invention, the first network's service software component includes a flashing software component for providing a flash image to a wireless device, in the wireless local area network, for adding a first wireless device capability.

According to an embodiment of the present invention, the first network service software component is a message software component for providing a message between a first wireless device and the second wireless device in the wireless local area network.

According to an embodiment of the present invention, the first network service software component is a service level enforcement software component for limiting and amount of packets transferred from a first wireless device in the wireless local area network to the wide area network during a period of time.

According to an embodiment of the present invention, the first network service software component is a Bluetooth™ LAN access profile software component.

According to an embodiment of the present invention, the first network service software component is a dial-up software component.

According to an embodiment of the present invention, the first network service software component is a virtual dial-up software component for providing packet switching in response to a circuit switching signal.

According to an embodiment of the present invention, a system for providing communication between a wide area network and a wireless local area network is provided. The system comprises a hand-held wireless device having a cellular transceiver for communicating with the wide area network. The hand-held device has a storage device for storing a routing software component for transferring a plurality of packets between the wide area network and the wireless local area network, wherein the hand-held wireless device has a wide area network address. A first wireless device has a 2.4 GHZ transceiver for transferring a first packet in the plurality of packets to the hand-held wireless device, wherein the first wireless device has a first local area network address.

According to an embodiment of the present invention, the first wireless device is selected from a group consisting of a desktop computer, a laptop computer, a personal digital assistant, a headset, a pager, a printer, a watch, a digital camera and an equivalent.

According to an embodiment of the present invention, the hand-held wireless device is a cellular telephone using a Global System for Mobile Communications ("GSM") protocol, Code Division Multiple Access ("CDMA") protocol, Universal Mobile Telecommunications Systems ("UMTS") protocol or Time Division Multiple Access ("TDMA") protocol.

According to still another embodiment of the present invention, the system comprises a second wireless device having a 2.4 GHZ transceiver for transferring a second packet in the plurality of packets to the hand-held wireless device, wherein the second wireless device has a second local area network address.

According to another embodiment of the present invention, an article of manufacture, including a computer readable medium, is provided. The computer readable medium comprises a routing software component of translating between a wide area network address and a local area network address. An interface software component allows a network service software component to be added. A short-range radio software component provides a short-range radio signal in a wireless local area network. A cellular software component provides a communication signal in a cellular network.

According to still another embodiment of the present invention, a managing processing device in a first wide area network is coupled to a hand-held device having a routing software component for transferring a plurality of packets between the first wide area network and the local area network. A device is coupled to the hand-held device and is in the local area network. The device transfers a first packet in the plurality of packets to the hand-held device.

According to another embodiment of the present invention, a device has an application, and the managing processing device has a manager software component, for accessing the application. The application may be a ring tone application or a phone book application.

According to another embodiment of the present invention, a microrouter software component stored on a first device runs an application on a second device in a local area network.

According to another embodiment of the present invention, the hand-held device includes a bridge software component for transferring a plurality of packets having an IP destination address from the wide area network to the local area network.

Other aspects and advantages of the present invention can be seen upon review of the figures, the detailed description, and the claims that follow.

DETAILED DESCRIPTION

I. System Overview

The following description and claims relate to a system, device and computer readable medium that monitors and reconfigures a LAN by an operator. In an embodiment of the present invention, a telecommunications operator in a WAN monitors and manages devices and/or applications in a LAN communicating with a wireless device, such as a cellular telephone. In an embodiment of the present invention, a telecommunication operator, by way of a manager server, adds LAN network services to a microrouter in a cellular telephone without user intervention.

In an embodiment of the present invention, a LAN is a network of processing devices, such as a personal computer or printer, that span a relatively small physical area. In an embodiment of the present invention, each processing device in a LAN has its own processing unit that executes a software component stored on the processing device memory, but also may access data and devices on the LAN. In an embodiment of the present invention, an Ethernet couples processing devices in a LAN. In an alternate embodiment, electromagnetic signals and wires couple processing devices in a LAN, singly or in combination.

In an embodiment of the present invention, a WAN includes multiple LANs connected over a relatively large distance. Telephone lines and electromagnetic signals, singly or in combination, couple the LANs in a WAN.

Figure 1:
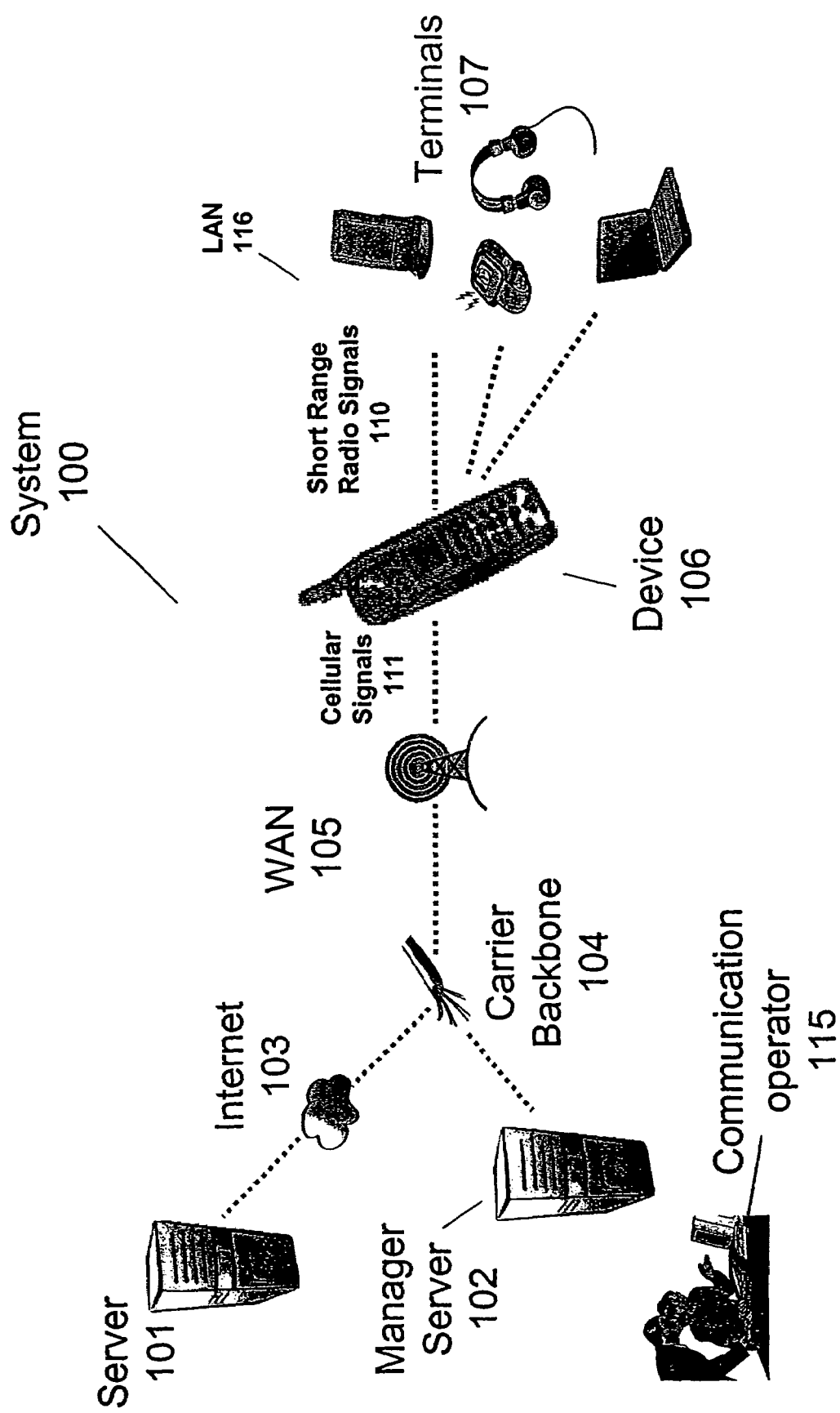
FIG. 1 illustrates a system according to an embodiment of the present invention.
Figure 3A:
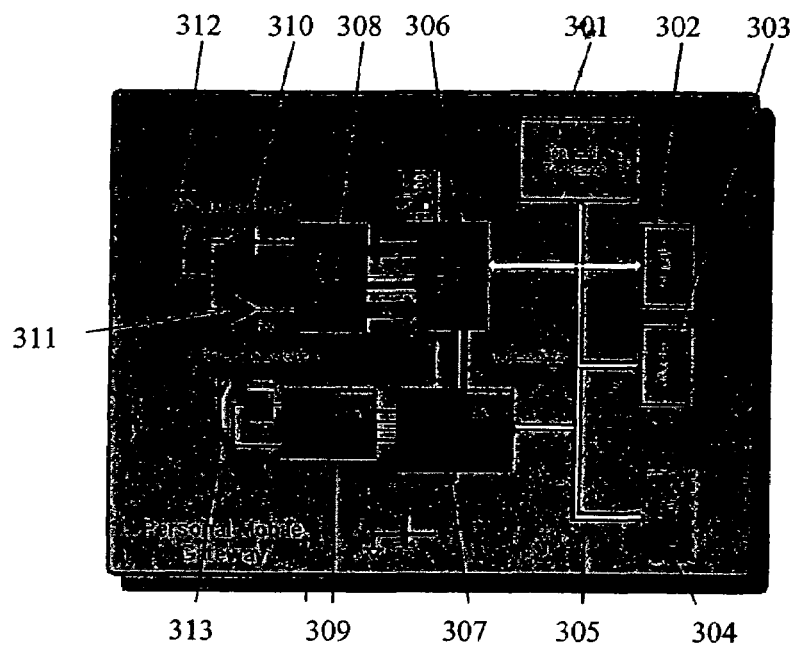
FIGS. 3a–b are hardware block diagrams of a wireless device and wireless hand-held device according to an embodiment of the present invention.
Figure 3B:
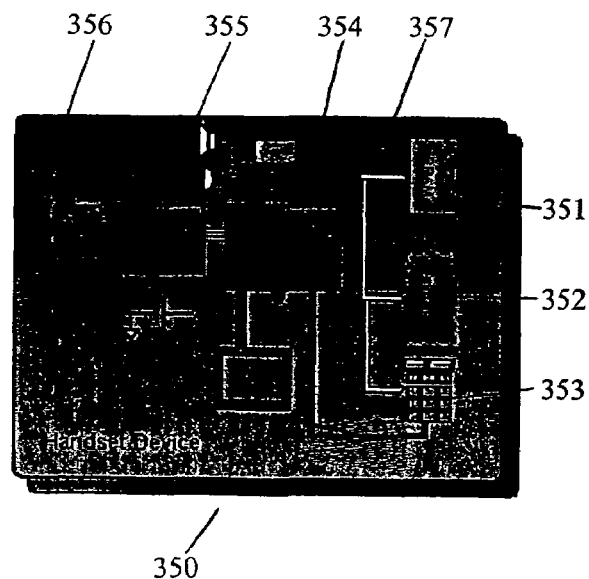

FIG. 1 illustrates system 100 according to an embodiment of the present invention. System 100 includes terminals 107 coupled to wireless device 106. In an embodiment of the present invention, device 106 and one or more terminals 107 communicate to form a LAN 116. In an embodiment of the present invention, terminals 107 are coupled to device 106 by short-range radio signals 110 to form LAN 116. In an embodiment of the present invention, some or all of terminals 107 may have wired connections. In an embodiment of the present invention, terminals 107 are a desktop computer, a laptop computer, a personal digital assistant, a headset, a pager, a printer, a watch, a thin terminal, a digital camera or an equivalent. In an embodiment of the present invention, terminals 107 include a Bluetooth™ 2.4 GHz transceiver/receiver. Likewise, device 106 includes a Bluetooth™ 2.4 GHZ transceiver/receiver. In an alternate embodiment of the present invention, a Bluetooth™ 5.7 GHZ transceiver/receiver is used. Device 106 and terminals 107 hardware is illustrated in FIGS. 3*a–b*.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000 or Time Division Multiple Access ("TDMA"), or General Packet Radio Service ("GPRS") protocol is used.

In an embodiment of the present invention, WAN 105, carrier backbone 104, and manager server 102 is, singly or in combination, a telecommunication network that is managed and monitored by operator 115. In an embodiment of the present invention, IP packets are transferred between the components illustrated in FIG. 1. In alternate embodiments of the present invention, other packet types are transferred between the components illustrated in FIG. 1.

In an embodiment of the present invention, a network described herein is an IP public or private network, such as a corporate secured network using a Virtual Private Network ("VPN").

In an alternate embodiment of the present invention, device 106 is coupled to a landline network by an Ethernet, Digital Subscriber Line ("DSL"), or cable modem connection, singly or in combination.

In an embodiment of the present invention, device 106 is coupled to a desktop computer coupled to WAN 105 by a landline connection. In an embodiment of the present invention, device 106 is coupled to the desktop computer by short-range radio signals.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, manager server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as web pages or application software components, to terminals 107 by way of device 106. In an embodiment of the present invention, manager server 102 provides a microrouter 404 and/or network service plug-ins 406*a–k* to device 106, as described below. Further, manager server 102, monitors applications and terminals in a LAN 116. In an embodiment of the present invention, terminals 107 share services and communicate by way of device 106.

II. Hand-held Device/Terminal Hardware

Figure 2:
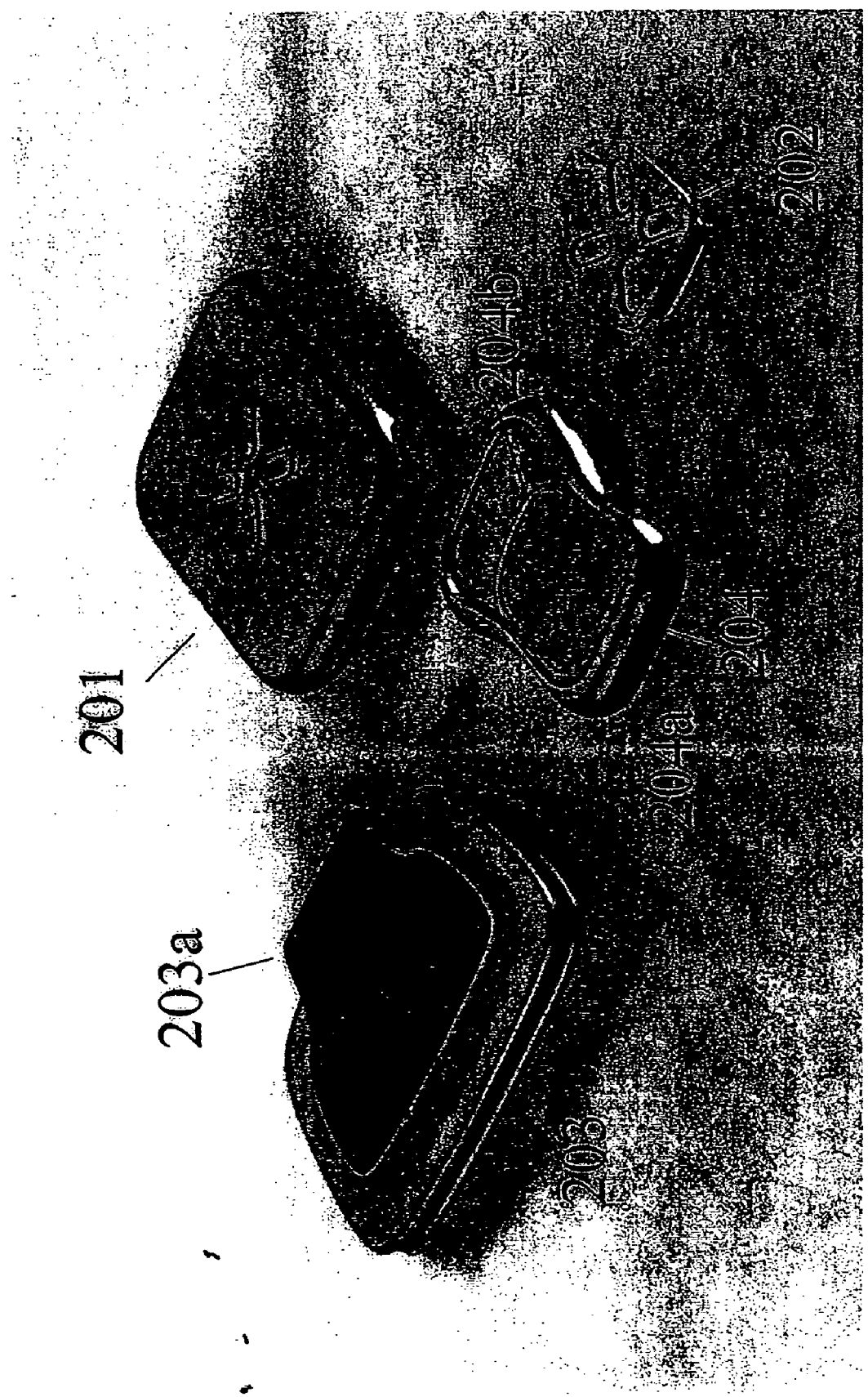
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. Smart terminals have a relatively powerful processing unit, operating system and applications. Their main needs from a LAN are access to a WAN through TCP/IP and other network services such as storage and execution. For example, a computer notebook and PDA are smart terminals. Thin terminals have a relatively low power processing unit and operating system. They are mainly used as peripherals to an application server in a LAN 116 and their main task is user interaction, rendering output for a user and providing an application server with a user's input. For example, a watch or a messaging terminal are thin terminals.

FIG. 2 illustrates thin terminals. Voice terminal 204 includes a display 204*b* and a retractable keypad 204*a*. Messaging Terminal 203 is illustrated in a closed position with a hinge 203*a* used to open and close terminal 203. Terminal 203 also includes a miniature QWERTY keyboard and display when opened. Device 201 includes clip 202 for a belt.

In an embodiment, device 201 is also illustrated in FIG. 2.

FIG. 3*a* illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM") and static Random Access Memory ("SRAM")) 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350 illustrated in FIG. 3b.

Cellular, such as GSM, signals are transmitted and received using digital circuit 306, analog circuit 308, transceiver 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals from device 300. In alternate embodiments, device 350 includes a display, a speaker, a microphone, a keypad and a touchscreen, singly or in combination.

III. Software

Figure 4:
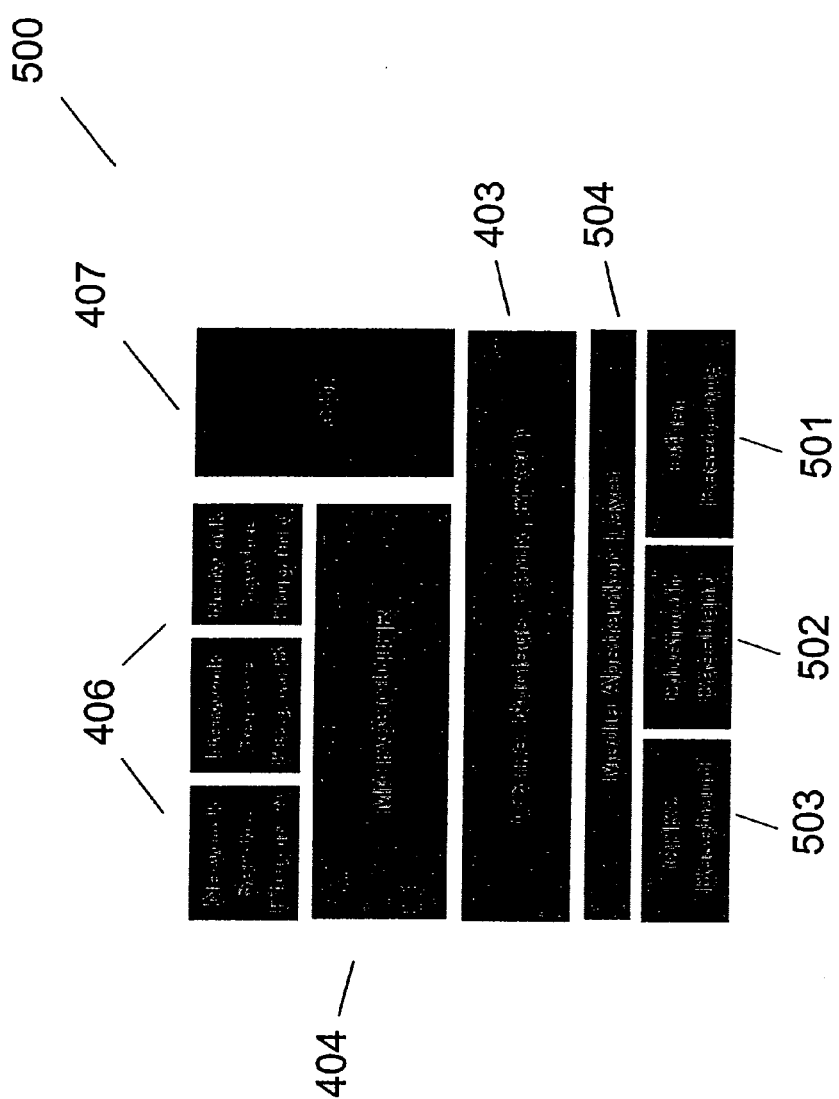
FIGS. 4 and 5 are software block diagrams for a wireless device according to an embodiment of the present invention.
Figure 5:
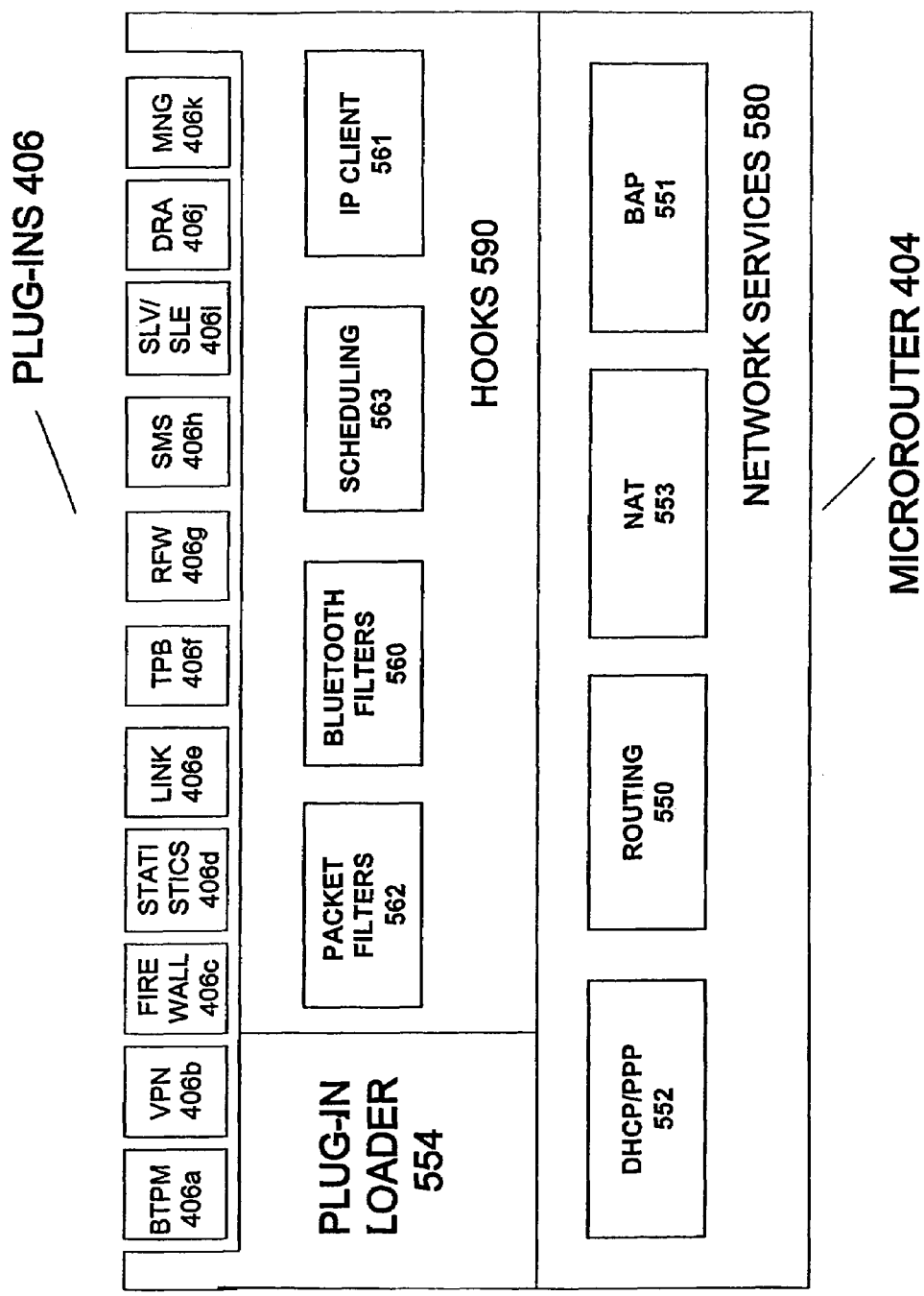
Figure 6:
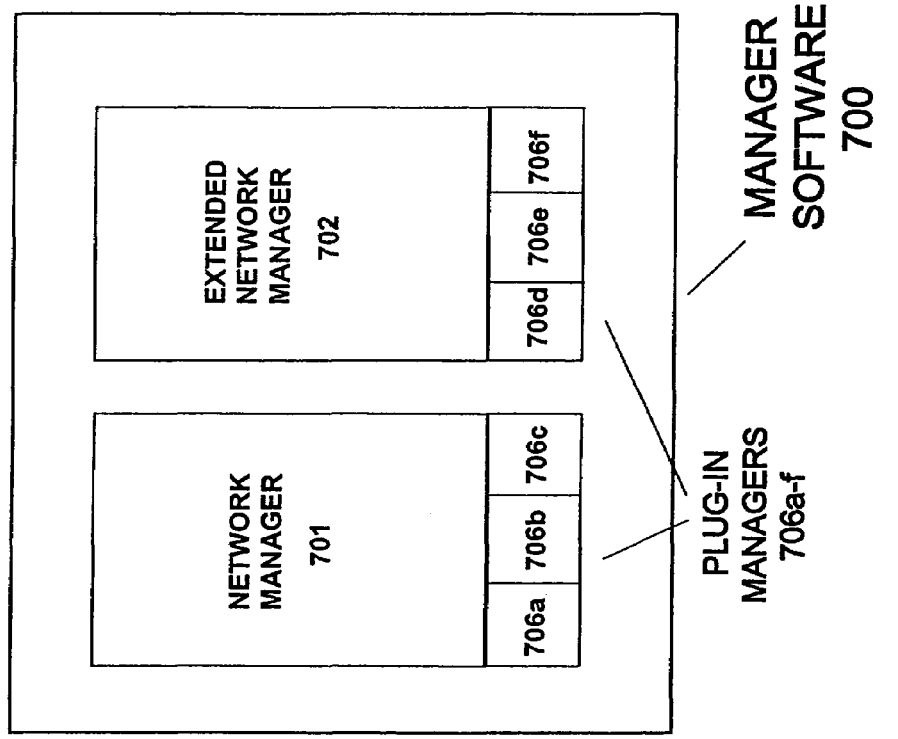
FIG. 6 is a software block diagram of manager software in manager server 102 illustrated in FIG. 1 according to an embodiment of the present invention.

FIG. 4 illustrates a software architecture 500 for device 106 illustrated in FIG. 3a according to an embodiment of the present invention. Software 500 is stored in FLASH memory 302. In an embodiment of the present invention, software components referenced in FIGS. 4-6 represent a software program, a software object, a software function, a software subroutine, a software method, a software instance, and a code fragment, singly or in combination. In an alternate embodiment, functions performed by software components illustrated in FIGS. 4-6 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination. In yet another embodiment, software 500, or components thereof, is downloaded from manager server 102 illustrated in FIG. 1.

Software 500 includes telecommunication software or physical layer protocol stacks, in particular cellular communications software 503 and short-range radio communications software 502. In an embodiment, communication software 503 is a GPRS baseband software component used with processor 306 to transmit and receive cellular signals. In an embodiment, communication software 502 is a Bluetooth™ baseband software component used with processor 307 to transmit and receive short-range radio signals. Other telecommunication software may be used as illustrated by other basebands 501.

In an embodiment of the present invention, operating system 403 is used to communicate with telecommunications software 502 and 503. In an embodiment of the present invention, operating system 403 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 403 manages hardware and enables execution space for device software components.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Furthermore, Graphics User Interface ("GUI") 407 is provided to allow a userfriendly interface.

Microrouter 404 and network service plug-in 406 enables an IP based network or enhanced IP based network, respectfully.

A. Microrouter

Microrouter 404 enables an IP based network between device 106 and terminals 107. In an embodiment of the present invention, each terminal can leverage the existing IP protocol, exchange information with other terminals and gain access to a WAN through microrouter 404. Extended network services, such as network service plug-ins 406 may be added to microrouter 404. In an embodiment, manager server 102, installs microrouter 404 and network service plug-ins 406 on device 106.

FIG. 5 illustrates software components of microrouter 404. In an embodiment of the present invention, routing component 550, Bluetooth™ LAN Access Profile component 551, Point-to-Point Protocol ("PPP") component 552 and Network Address Translator ("NAT") component 553 are included in microurouter 404. In an alternate embodiment, other components, such as packet filters 562, Bluetooth™ filters 560, scheduling 563 and IP client 561 are included in microrouter 404. In still another embodiment, microrouter 404 includes hooks 590 for adding network services plug-ins 406.

1. Microrouter Services

In an embodiment, microrouter 404 services include software components for an IP LAN that has access to a WAN. In an embodiment, the software components included in a microrouter 404 are described below.

a. Bluetooth™ Access Profile ("BAP")

BAP software component 551 enables Bluetooth™ terminals to gain access to a LAN 116 and a WAN by using an IP protocol.

In an embodiment of the present invention, BAP 551 includes implementation of two Bluetooth™ usage profiles such as: 1) Bluetooth™ LAN Access Profile software and 2) Bluetooth™ Dial-Up Profile software.

Bluetooth™ LAN Access Profile software component allows a LAN Access client in a terminal to obtain an IP address and use the IP address in order to gain connectivity to other LAN terminals or to a WAN, behaving as if they were on a LAN.

Bluetooth™ Dial-Up Profile software component enables a terminal to dial-up to any termination number and get IP services from that termination. In addition, a Bluetooth™ Dial-Up Profile ("DUP") software component emulates termination in device 106. In an embodiment, microrouter 404 has either a Bluetooth™ LAN Access Profile software component or a Bluetooth™ Dial-Up Profile software component. In an alternate embodiment, microrouter 404 includes both Profile software components. In a Bluetooth™ Dial-Up Profile software component mode, a terminal dials a predefined number, for example 999, for which microrouter 404 will not actually dial the number over a cellular network, but emulates as if the number was dialed and a modem answered the call. Microrouter 404 will provide the terminal with an IP address and access to WAN 105. From the terminal's point of view it is as if the terminal dialed a number 999 to a modem and received an IP service from that modem, but in reality the terminal used DUP to obtain packet switching access to WAN 105 and the call was actually terminated at microrouter 404.

b. Routing

Routing software component 550 is responsible for transferring IP packets either in a LAN or toward a WAN. In a LAN 116, Routing 550 handles broadcasting IP packets and transferring IP packets between terminals. Routing 550 is also responsible for LAN IP Broadcast emulation.

Routing component 550 is responsible for IP packet queuing/dropping. A IP packet dropping software component is used for reducing congestion caused by having more than one terminal connected simultaneously. In an embodiment of the present invention, routing 550 includes a queuing software component, Quality of Service software component or equivalent for queuing IP packets. Likewise, routing component 550 includes a dropping software component that is configured by manager server 102, a user or any other remote entity. In an embodiment of the present invention, manager server 102 defines and loads an IP packet queuing/dropping software component. An operator 115 will be able to define a particular queuing/dropping software component that is suitable for a particular LAN 116 or user. A user will have a better LAN 116, and thus a better user experience, without having to configure or monitor a LAN 116.

In an alternate embodiment of the present invention, routing software component 550 is a bridge software component for transferring an IP address.

c. PPP

In an embodiment of the present invention, microrouter 404 includes a PPP software component 552, such as a PPP server that is the termination for a LAN access profile software component. A PPP server provides IP network information, such as an IP address, DNS address or the like, to a terminal.

d. NAT

NAT software component 553 is used because 1) only one public IP address is typically made available to a cellular telephone and 2) in order to conserve public IP addresses provided by an operator. In an embodiment of the present invention, WAN 105, and in particular, a cellular packet switching network provides device 106 with one public IP address. A LAN 116 however includes more than one participating terminal. In order to provide IP addresses to all terminals 107, private LAN IP addresses will be used for LAN terminals while NAT 553 is responsible for translations between private LAN IP addresses and public WAN addresses, and vice versa.

2. Hooks to Extended Network Service Plug-Ins

In an embodiment of the present invention, microrouter 404 includes hooks 590 allowing for the extension of microrouter 404 networking services, such as plug-ins 406. In an embodiment of the present invention, hooks 590 are application program interfaces ("API") for plug-ins 406.

In an embodiment of the present invention, Microrouter 404 is programmed to have only basic network abilities and a very low footprint, or in other words require very little memory, for example 100 K bytes, in order to be stored in a device 106, such as a cellular telephone. However, in some instances more network services will be needed. Further, operators may want the ability to add and sell network services after the device 106 is sold and in operation without user intervention. A user may be less likely to purchase a network service if the user has to return device 106 to the manufacture or inconvenient site.

For these and other reasons, the microrouter 404 includes hooks 590 that enable plug-ins 406 to be implemented in an embodiment of the present invention. This plug-in capability does not define a full execution environment but defines a small framework for implementing code, which can plug-in and extend microrouter 404 network services. In an embodiment of the present invention, hooks 590 is not a user application framework, plug-in code abilities are limited and serves only as an extension to network services.

Plug-ins 406 are fully activated by microrouter 404, which has full control over them in an embodiment of the present invention. In some sense, plug-ins are like a Dynamic Link Library ("DLL") that have a predetermined set of functions that a microrouter can call in order for them to realize the needed functionality.

Below describes software components included in hooks 590 for implementing plug-ins 406 according to an embodiment of the present invention. In an alternate embodiment, other software components are included or replace illustrated software components in hooks 590. For example, software components implementing functionality used by all plug-ins 406, such as hooks for centralized configuration and backend connectivity, are included in hooks 590 in an embodiment of the present invention. These included software components in hooks 590 will save resources and allow for efficient operation.

a. Packet Filters

Packet filters software component 562 allows plug-ins 406 to process IP packets going either internally in a LAN 116 or externally to and from a WAN. By enabling plug-ins 406 to process IP packets and change any part of a packet, drop a packet or generate more packets, microrouter 404 is able to include multiple other added extended network services. For example, microrouter 404 is able to include a VPN, a firewall, tag packets, monitor packets and other extended network services described below. In an embodiment of the present invention, a packet filters 562 is a data path for transferring IP packets that are accessible by plug-ins 406.

b. Bluetooth™ Filters

Bluetooth™ filters software component 560 enables plug-ins 406 to process Bluetooth™ information. In an embodiment, Bluetooth™ filters 560 processes a pairing request event and provides a PIN number. In an embodiment of the present invention, Bluetooth™ filters 560 enable added network services such as PIN management, denying access to a LAN 116 from a terminal, authenticating a terminal, pairing through a interactive voice response ("IVR") system or the Internet. In an embodiment of the present invention, a Bluetooth™ filters 560 is a data path for transferring Bluetooth™ information that is accessible by plug-ins 406.

c. Scheduling

In order for plug-ins 406 to be able to generate events, traffic or do periodic tasks, a scheduling software component 563 enables a plug-in to receive a callback periodically or when required by the plug-in. For example, Scheduling 563 enables a statistics plug-in to send statistic information on terminal and application usage every X hours or calculated average traffic at a selected terminal.

d. IP Client

In an embodiment of the present invention, IP Client 561 makes available IP services to plug-ins 406 so a plug-in can obtain an IP address, send IP packets and/or receive IP packets. Thus, IP Client software component 561 enables a plug-in to obtain a private IP address from microrouter 404 and connect to a backend server, such as manager server 102. An IP client 561 plug-in can implement a TCP/IP stack or User Datagram Protocol ("UDP"). In an embodiment of the present invention, IP Client plug-in 561 uses all necessary microrouter 404 network services, such as packet filters 562 or NAT 553. From a microrouter 404 perspective, an IP Client 561 is treated like any other terminal on a LAN 116.

3. Plug-In Loader

A plug-in can be attached to a microrouter 404 during or after manufacturing. In an embodiment of the present invention, a plug-in is stored or programmed in device 106 before shipping from a manufacture. Alternately, a plug-in is downloaded from manager server 102 at run-time over WAN 105.

A plug-in loader software component 554, as illustrated in FIG. 5, is responsible for loading plug-ins 406, programming of plug-ins 406 and notification of newly available plug-in 406 to microrouter 404 in an embodiment of the present invention.

In an embodiment of the present invention, plug-in loader 554 will use operating system 403 capabilities for programming a file system and access of plug-ins 406. In an alternate embodiment of the present invention, plug-in loader 554 uses a plug-in directory in a dedicated memory space of device 106.

4. Microrouter Extended Service Plug-Ins

Below describes microrouter 404 extended service plug-ins 406 in an embodiment of the present invention. In various embodiments of the present invention, one or more of plug-ins 406 are attached to microrouter 404. In alternate embodiments, other plug-ins are attached to microrouter 404. In an embodiment of the present invention, a device manufacturer, terminal manufacturer, an operator 115 and/or other third party provides a plug-in.

a. Bluetooth™ Terminal Pairing Management ("BTPM")

BTPM software component plug-in 406a is responsible for PIN management and authenticating terminals for participating in a LAN 116. BTPM 406a allows an operator 115 to control which terminal can connect to a LAN 116. For example, an operator 115 can deny a terminal from pairing to a LAN 116, or can approve a terminal for pairing. In an embodiment of the present invention, pairing is done over an IVR, the Internet and/or by a user.

b. VPN

VPN software component plug-in 406b enables a secure link to a network, such as a private corporate network. VPN enables terminals to connect to a corporate file server, exchange server or an equivalent. VPN 406b uses packet filters 562 in order to identify packets that are routed to a corporate LAN IP subnet. In an embodiment of the present invention, VPN 406b then encrypts and tunnels the identified IP packets.

c. Firewall

Firewall software component plug-in 406c protects a LAN 116 from intruders and hackers. In an embodiment of the present invention, Firewall 406c uses packet filters 562 for identifying IP packets from non-authorized sources and IP packets that are sent to non-authorized servers. In an embodiment of the present invention, firewall 406c enables Uniform Resource Locator ("URL") filtering.

d. Statistics

In an embodiment of the present invention, statistics software component plug-in 406d collects usage profiles and statistics on 1) which terminal in a LAN 116 is used, 2) how much traffic is generated by each terminal, and 3) by each application. Statistics 406d enables an operator 115 to promote used terminals and build billing schemes.

e. Link Optimizations

Implementing direct TCP/IP and Internet application protocols over WAN 105, and in particular a wireless network, produces poor performance because of low bandwidth, transmission delays and high data error rates. In order to solve the poor performance but still enable terminals to use standard TCP/IP, a Link Optimization software component plug-in 406e is provided. Link Optimization 406e traps all TCP/IP and specific Internet application protocols, such as Simple Mail Transfer Protocol ("SMTP") and Hypertext Transfer Protocol ("HTTP"), and converts the protocol to an optimized protocol. Link Optimization 406e then sends the converted packets to a backend server, such as manager server 102, which than deconverts the packets and sends them onto the Internet. In an embodiment of the present invention, terminals and users are not aware of using Link Optimization 406e.

f. Reverse Firewall

As opposed to a typical LAN firewall that protects a LAN 116 from intruders and hackers from the Internet or another network, a Reverse Firewall ("RFW") software component plug-in 406g protects an operator 115 or another network from terminals and applications on a LAN 116 generating traffic toward those networks. RFW 406g enables an operator 115 or another entity to define and enforce usage policies for applications/terminals on a LAN 116. RFW 406g prevents unnecessary costly transmission costs. Enforcement of usage policies at the LAN level (i.e. at device 106) prevents expensive packets from going through a cellular network that will be eventually dropped. Further, packets that may be later dropped do not use the limited cellular transmission bandwidth.

In an embodiment of the present invention, RFW 406g is attached to a cellular handset that has Bluetooth™ capability for implementing a LAN 116 and GSM/GPRS for cellular access to a WAN 105 (i.e. Internet or any other network). RFW 406g is programmed to drop packets based on the originating terminal, originating application/terminal pair or original application. For example, if a user has a PDA and a Notebook, an operator 115 can configure for File Transfer Protocol ("FTP") packets from the PDA to be dropped if FTP from a PDA is not allowed, or for example to drop video streaming packets originated from the Notebook if video streaming is something the operator 115 does not allow.

Another example includes blocking Notebook usage of such software as Napster in order to avoid cellular unintended usage by users and associated cost.

g. Terminal Programming Over Bluetooth™ ("TPB")

TPB software component plug-in 406f enables the programming of terminals 107 over Bluetooth™ and over a cellular network. In an embodiment of the present invention, programming a terminal is accomplished by "flashing" or programming EEPROM memory in a terminal. An operator 115 or manufacturer can transfer a flash image to be flashed to device 106 having microrouter 404, and terminals 107 to be flashed. TPB 406*f* communicates with a Flashing software component in a terminal to 1) initiate the flashing process, 2) authenticate the flash image and 3) secure the flashing process.

In an embodiment of the present invention, flashing is done by transferring a full flash image. Alternatively, if there is not enough memory for the full flash image in device 106, the flash image is transferred block by block to eventually be flashed.

TPB 406*f* enables customizing a terminal, fixing software running on a terminal, and adding applications and/or improvements.

h. Short Message System ("SMS") Plug-In

SMS software component plug-in 406*h* allows terminals 107 to send messages between each other in a LAN 116. In an embodiment of the present invention, a terminal is a Messaging Terminal that enables Instant Messaging over IP. In an alternate embodiment of the present invention, SMS 406*h* enables standard legacy SMS or Instant Messaging over SMS.

In an embodiment of the present invention, SMS 406*h* is an SMS server for terminals 107 and an SMS termination for device 106. In this way, a protocol will be defined that enables each terminal to send a packet to SMS 406*h* with a destination device phone number+message text. SMS 406*h* then send the SMS message to a cellular network.

SMS 406*h* also serves as an SMS receiver in an embodiment of the present invention. A terminal can inquire SMS 406*h* for received SMS messages and fetch those messages. In still another embodiment of the present invention, a terminal will also receive an IP broadcast message each time an SMS message is received by device 106.

i. Service Level Verification ("SLV")/Enforcement ("SLE")

SLV/SLE software component plug-in 406*i* enables an operator 115 to verify and enforce service level agreements with users. If an operator 115 wants to enforce service levels, such as specifically limiting the amount of traffic over a cellular network, SLV/SLE 406*i* is added in order to avoid usage of expensive airtime.

In an embodiment of the present invention, SLV/SLE 406*i* allows a user to generate an unlimited amount of cellular traffic from device 106 during the night but a limited amount during the day. So during the day, if the limited amount is exceeded no more traffic can be generated from device 106 and packets are dropped by SLV/SLE 406*i*. Similar policies may likewise be enforced. SLV/SLE 406*i* also identifies and notifies operator 115 of missed cellular network usage by a particular user due to enforcement in an embodiment of the present invention.

j. Device Resources Access ("DRA")

DRA software component plug-in 406*j* enables terminals to gain access (according to defined restrictions) to device 106 resources. This enables a terminal to implement a Device Resources Access protocol over IP in order to gain access to any of the following resources: 1) phone book, 2) play a ring tone, 3) initiate a call, 4) user interface, or 5) other device resources.

DRA 406*j* enables a terminal to read/modify/add phone book entries in a phone book stored on device 106. In a preferred embodiment, a vCard format is used to exchange entry information between device 106 and terminals 107. This enables a better consistent experience for users. For example, DRA 406*j* provides a user immediate access to a device 106 phone book entries for sending a message from a messaging terminal without having to type the contact information from the phone book.

DRA 406*j* enables a user to be alerted by using a device 106 ring buzzer. Thus, a terminal in LAN 116 can use a device 106 ring buzzer for alerting a user.

DRA 406*j* enables a terminal, such as a PDA or an Outlook application on a notebook computer, to initiate a telephone call at device 106. In an embodiment of the present invention, clicking a phone icon near a phone number on a notebook display initiates a cellular telephone call.

Likewise, DRA 406*j* enables a terminal to interact with a user through device 106 menus and input components.

k. Terminal Management/Monitoring ("MNG")

MNG software component plug-in 406*k* enables management, configuration and monitoring of terminals 107 in an embodiment of the present invention. Instead of each terminal implementing a proprietary management protocol and console, each terminal exposes a "registry" of parameters and MNG 406*k* implements a protocol enabling a managing server 102 to browse this registry, get values and set values.

IV. Usage Scenarios

A. PDA Synchronizes Against the Corporate Exchange Server

In this scenario, a user is a traveling professional who has a PDA and needs to synchronize it against a corporate exchange server while on the road. This synchronization needs to be done securely as the only way to enter the corporate network is via a certified and Information Technology ("IT") manager approved VPN.

The user also has a cellular telephone having a microrouter 404 and VPN client 406*j*, which the IT manager installed. The IT manager used the remote management capabilities of the cellular telephone in order to configure a VPN to connect to the corporate network, as well as configured the firewall to block Internet access while the VPN is in use. The user is totally unaware of the VPN and its configurations.

As the user turns on the PDA, which is a Bluetooth™ equipped PDA with a LAN Access profile implementation, the PDA connects to the cellular telephone via the BAP 551 utilizing Bluetooth™. The PDA receives a private IP address.

The user loads the PDA synchronization software, which is configured to synchronize against the corporate exchange server. When hitting the "Synchronize" button, the PDA opens a TCP connection to the IP address of the corporate network.

The IP packets travel across the Bluetooth™ air interface to the cellular telephone using a PPP protocol and PPP 552. When reaching the cellular telephone, the packets go through NAT 553 and the private IP address is translated to a public IP address. The public IP address goes to VPN 406*f*, which identifies the destination as the corporate LAN. VPN 406*f* packages the packet over an Internet tunnel, encrypts and signs it. The packet is then sent through the cellular air interface and the Internet, reaching the corporate VPN and exchange servers. The PDA is totally unaware of this process.

B. PDA Synchronizes Against a Notebook on the LAN

In this scenario, the user, as described above, needs to synchronize the PDA with a notebook computer.

The notebook has a Bluetooth™ card with a LAN access profile. Once the notebook is turned on, it connects to the user's cellular telephone having microrouter 404 and receives a private IP address.

The user runs the same synchronization software on his PDA, only this time chooses to synchronize with the notebook.

When hitting the "Synchronize" button on the PDA, the PDA opens a TCP connection to the notebook's IP address.

An IP packet travels, from the PDA, through the Bluetooth™ interface over a PPP protocol and reaches routing 550 in microrouter 404 that identifies the packet destined to a private IP address of the notebook. The IP packet is then sent to the notebook through the notebook's Bluetooth™ interface over a PPP protocol.

C. Web Pad Browsing the Internet

In this scenario, a user has a Web Pad equipped with a Bluetooth™ interface with a LAN access profile. The Web Pad is connected to the cellular telephone having microrouter 404, which is in the users bag, and receives a private IP address through the LAN access profile. The Web Pad also has a web browser.

The user pulls out his Web Pad, goes to a URL line of the browser and types http://www.iximobile.com. The web browser first has to translate the name www.iximobile.com into a public IP address. This is done using a Domain Naming Service ("DNS") protocol. The Web Pad already received the private IP address of a DNS plug-in when it connected to the cellular telephone. The Web Pad sends a resolve request to the DNS plug-in software component in microrouter 404. DNS software component looks at its cache for the name. If the name is not available, the DNS plug-in software component goes to the next DNS on a WAN 105 to get the public IP address of the name. In both cases, the DNS eventually gets the public IP address for www.iximobile.com and sends the reply back to the Web Pad. In an embodiment of the present invention, a DNS software component is a plug-in 406 or a hook 590.

When the Web Pad receives the public IP address of the web site, it opens a TCP connection at port 80 of that public IP address in order to implement the HTTP protocol and get the HTML page to display.

V. Manager Server

In an embodiment of the present invention, Manager server 107, illustrated in FIG. 1, includes Manager software component 700 illustrated in FIG. 6. In an embodiment of the present invention, manager software 700 is used to load micro router 404 and plug-ins 406 into device 106. In an additional embodiment of the present invention, manager software 700 is used to manage, configure and collect data from LAN 116. In still another embodiment of the present invention, manager software 700 is not used with LAN 106.

Manager server 102 includes a Proliant server available from Compaq® Computer Corporation of Houston Tex. having a Windows® 2000 operating system available from Microsoft® Corporation in an embodiment of the present invention.

In an embodiment of the present invention, manager 700 has an IP interface in order to gain access to microrouter 404 and access a device notification service, such as SMS 406h. Manager 700 can be installed on any network that has IP connectivity to microrouter 404. Manager 700 can be installed by a service provider on Internet 103, or by an operator 115 on its IP backend network having server 102.

Manager 700 includes two software components, network manager 701 and extended network manager 702, in an embodiment of the present invention.

Network manager 701 is responsible for, but not limited to, the following functions: 1) configuring an IP parameter, such as IP domain range or policies, 2) configuring plug-ins 406 currently installed and executed, 3) enabling/disabling an installed plug-ins 406, 4) loading new plug-ins in microrouter 404, and 5) removing plug-ins 406 from microrouter 404.

Network extended manager 702 is responsible for, but not limited to, the following functions: 1) collecting usage profiles for each microrouter 404 and each terminal in LAN 116, 2) managing PINs, such as denying access to LAN 116 for a particular terminal or approving access to LAN 116 for other terminals, 3) managing security, such as configuring VPN 406b or configuring Firewall 406c, 4) configuring Link Optimization 406e, and 5) configuring Quality of Service ("QoS") parameters in microrouter 404.

In an embodiment of the present invention, plug-in manager software components 706a–f are stored in manager server 102 and use network manager software component 701 and/or extended network manager software component 702 for accessing and controlling network plug-ins 406a–k. For example, a plug-in manager software component 706d is used to obtain statistics information from statistics plug-in 406d in microrouter 404. In an embodiment of the present invention, there is a corresponding plug-in manager software component in manager software 700 for every plug-in software component in microrouter 404.

VI. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A hand-held device for enabling communication between one or more devices connected to one or more cellular networks and one or more devices connected to a wireless local area network, comprising:
   a) a first transceiver to communicate with the one or more devices connected to said one or more cellular networks by sending and receiving cellular signals, the first transceiver having a cellular network address;
   b) a second transceiver to communicate with the one or more devices connected to the wireless local area network by sending and receiving short-range radio signals;
   c) a storage device to store:
      c.1. a router software component to transfer a plurality of data packets between the one or more devices connected to the one or more cellular networks and the one or more devices connected to the wireless local area network by the cellular signals and the short-range radio signals; and
      c.2. an interface software component to add a first network service software component that provides one or more network services to the wireless local area network, the first network service software component loaded into the storage device from the one or more devices connected to the one or more cellular networks: and one or more processors connected to the storage device to process the cellular signals and the short-range radio signals, wherein the cellular network includes a plurality of public IP addresses and the wireless local area network includes a plurality of private IP addresses, and wherein the router software component translates a first IP address in the plurality of public IP addresses to a second IP address in the plurality of private IP addresses.

2. The hand-held device of claim 1, wherein the plurality of data packets includes an Internet Protocol ("IP") packet.

3. The hand-held device of claim 1, wherein the one or more cellular networks are connected to the Internet.

4. The hand-held device of claim 1, wherein the one or more cellular networks are connected to a corporate network.

5. The hand-held device of claim 1, wherein the one or more cellualr networks are connected to a private IP network.

6. The hand-held device of claim 1, wherein the wireless local area networks include a Bluetooth™ wireless local area network.

7. The hand-held device of claim 1, wherein the wireless local area networks include a 802.11 wireless local area network.

8. The hand-held device of claim 1, wherein the router software component includes a network address translator ("NAT") software component to translate between the cellular network address and a first wireless local area network address.

9. The hand-held device of claim 1, wherein the router software component includes a network address port translation ("NAPT") software component to translate between the cellular network address and a first wireless local area network address.

10. The hand-held device of claim 1, wherein the router software component includes a local routing software component to route an IP packet between a first wireless device in the wireless local area network and a second wireless device in the wireless local area network.

11. The hand-held device of claim 1, wherein the first network service software component is a pairing management software component to determine whether a first wireless device, which is connected to the wireless local area network, is responsive to a signal from the one or more devices connected to the one or more cellular networks.

12. The hand-held device of claim 1, wherein the first network service software component is a virtual private network software component to establish a secure link.

13. The han-held device of claim 1, wherein the first network service software component is a firewall software component.

14. The hand-held device of claim 1, wherein the first network service software component is a statistics software component to collect usage information of the wireless local area network.

15. The hand-held device of claim 14, wherein the statistics software component collects usage information of a first wireless device in the wireless local area network.

16. The hand-held device of claim 14, wherein the statistics software component collects usage information of an application software component in a first wireless device in the wireless local area network.

17. The hand-held device of claim 1, wherein the first network service software component includes a link optimization software component to convert an IP packet included in the plurality of data packets from a first wireless device in the wireless local area network to an optimized cellular protocol packet.

18. The hand-held device of claim 1, wherein the first network service software component includes a reverse firewall software component to drop a packet included in the plurality of data packets from a first wireless device in the wireless local area network.

19. The hand-held device of claim 1, wherein the first network service software component includes a reverse firewall software component to drop a packet included in the plurality of data packets from a first application software component on a first wireless device in the wireless local area network.

20. The hand-held device of claim 1, wherein the first network service software component includes a flashing software component to provide a flash image to a first wireless device, in the wireless local area network, to update capability of the first wireless device.

21. The hand-held device of claim 1, wherein the first network service software component includes a flashing software component to provide a flash image to a first wireless device, in the wireless local area network, that repairs the first wireless device.

22. The hand-held device of claim 1, wherein the first network service software component includes a flashing software component to provide a flash image to a first wireless device, in the wireless local area network, to add capability of the first wireless device.

23. The hand-held device of claim 1, wherein the first network service software component is a message software component to provide a message between a first wireless device and a second wireless device in the wireless local area network.

24. The hand-held device of claim 1, wherein the first network service software component is a service level enforcement software component to limit an amount of packets transferred from a first wireless device in the wireless local area network to the one or more cellular networks during a period of time.

25. The hand-held device of claim 1, wherein the first network service software component is a Bluetooth™ LAN Access Profile software component.

26. The hand-held device of claim 1, wherein the first network service software component is a Bluetooth™ Dial-Up Profile software component.

27. The hand-held device of claim 1, wherein the first network service software component is a Virtual Bluetooth™ Dial-Up Profile software component to provide packet switching in response to a circuit switching signal.

28. A system for enabling communication between one or more devices connected to one or more cellular networks and one or more devices connected to a wireless local area network, the system comprising:
  a) a managing processing device connected to the one or more cellular networks for managing, collecting and configuring data in the wireless local area network;
  b) a hand-held device connected to the managing processing device and connected to the wireless local area network, the handheld device comprising:
    b.1. a router software component to transfer a plurality of packets between one or more devices connected to the one or more cellular networks and the one or more devices connected to the wireless local area network by the cellular signals and the short-range radio signals; and
    b.2. an interface software component to add a first network service software component that provides one or more network services to said wireless local area network, the first network service software component loaded into the hand-held device by the managing processing device, including a managing software component, sending the cellular signals over the one or more cellular networks; and c) a device connected to the hand-held device and connected to the wireless local area network to transfer a first packet in the plurality of packets to the hand-held device, wherein the router software component maintains a first IP session link with a first cellular network in the one or more cellular networks and a second IP session link with a second cellular network in the one or more cellular networks.

29. The system of claim 28, wherein the router software component tunnels the plurality of packets to the managing processing device and wherein the managing processing device processes the plurality of packets.

30. The system of claim 28, wherein the router software component maintains a first IP session link with a first cellular network in the one or more cellular networks responsive to an amount of IP packets received in the plurality of packets.

31. The system of claim 28, wherein the router software component initiates a first IP session link with a first cellular network in the one or more cellular networks responsive to a signal from the managing processing device.

* * * * *